March 3, 1959 J. P. MARCY 2,875,993
MULTI-CONTACT FRACTIONATION TRAY
Filed Feb. 6, 1956 2 Sheets-Sheet 1

INVENTOR.
John P. Marcy
BY
ATTORNEY

March 3, 1959 J. P. MARCY 2,875,993
MULTI-CONTACT FRACTIONATION TRAY
Filed Feb. 6, 1956 2 Sheets-Sheet 2
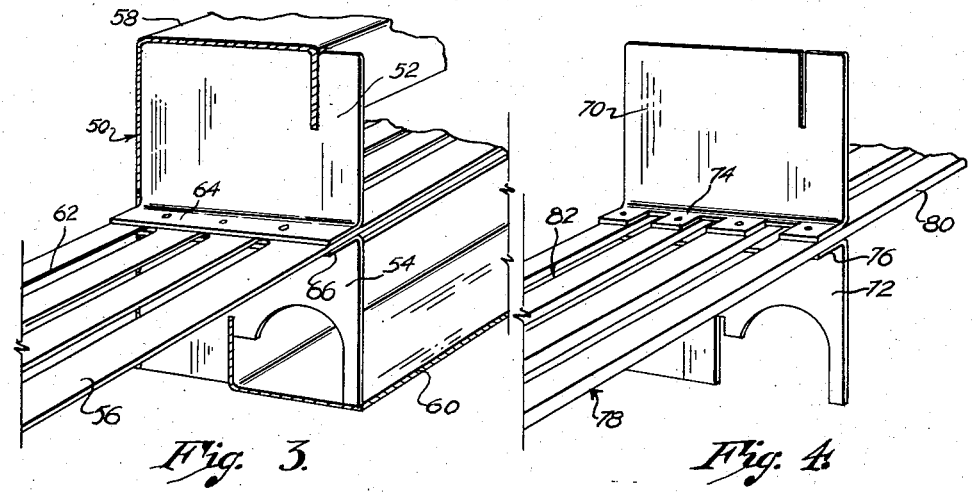
Fig. 3. Fig. 4.
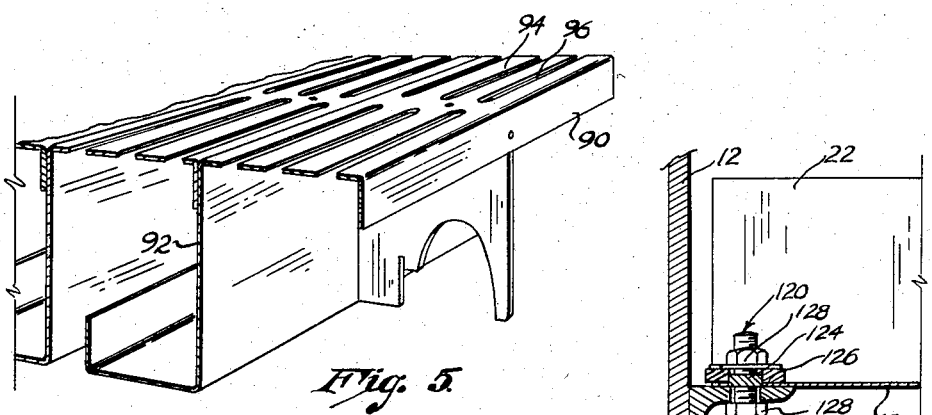
Fig. 5. Fig. 7.
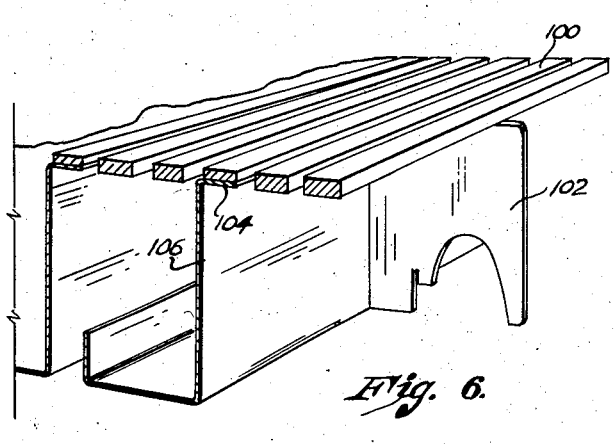
Fig. 6.
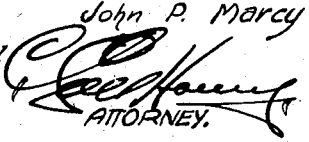
INVENTOR.
John P. Marcy
BY
ATTORNEY.

United States Patent Office 2,875,993
Patented Mar. 3, 1959

2,875,993

MULTI-CONTACT FRACTIONATION TRAY

John P. Marcy, San Gabriel, Calif.

Application February 6, 1956, Serial No. 563,550

10 Claims. (Cl. 261—113)

This invention relates to a fractionation tray for distillation and absorption towers and more particularly to a device for intimately contacting vapor and liquid, the primary object being to provide for improved vapor-liquid contact through the provision of a simple, inexpensive, lightweight tray that is sufficiently strong to span the distance across the tower or column without necessity of utilizing excessive structural supports.

More specifically, the invention relates to apparatus designed to be employed in fractional distillation, absorption, condensation or stripping of liquids or gases as the same move through the column, and having a tray of such novel arrangement and construction as to materially increase the capacity of the column.

Another important object of this invention is to provide improved apparatus for transfer of fluids from one tray level to another wherein a vertical series of offset trays are each formed in a manner to eliminate downspouts commonly employed for conducting the fluid from one tray level to the tray below and wherein there is no necessity for weirs on the trays to establish a liquid level, and finally, wherein the conventional seal pot below the downcomers is eliminated, thereby permitting free upward passage of vapors from a lower tray to a higher tray with the resultant multi-contact operation and perfection in performance.

Another important object of the present invention is the provision of a tray having an open area of such size as to cause rising vapors within the tower to hold a liquid level of downflowing liquid on the tray and the latter being provided with openings for downflow of liquid and rising of the vapors formed and arranged in such manner as to prevent excessive pressure drop across the tray, and so graduated as to retard flow of liquid but not absolutely restrict such flow.

A further important object of the present invention is to provide for high capacity by virtue of the fact that the liquid is frothed by vapor contact not only at the top and bottom of the tray but at an intermediate turbulent zone therewithin.

A still further object of the instant invention is to provide a highly flexible fractionation tray that is equally efficient when the tower is operating at substantially less than design capacity.

Other objects include important details of construction to be made clear as the following specification progresses, reference being had to the accompanying drawings, wherein.

Figs. 3 to 6, inclusive, are fragmentary, perspective views of modified forms of tray structure embodying the principles of the instant invention; and Fig. 7 is an enlarged, fragmentary, cross-sectional view illustrating one manner of mounting of the tray within the fractionating tower.

Figure 1:
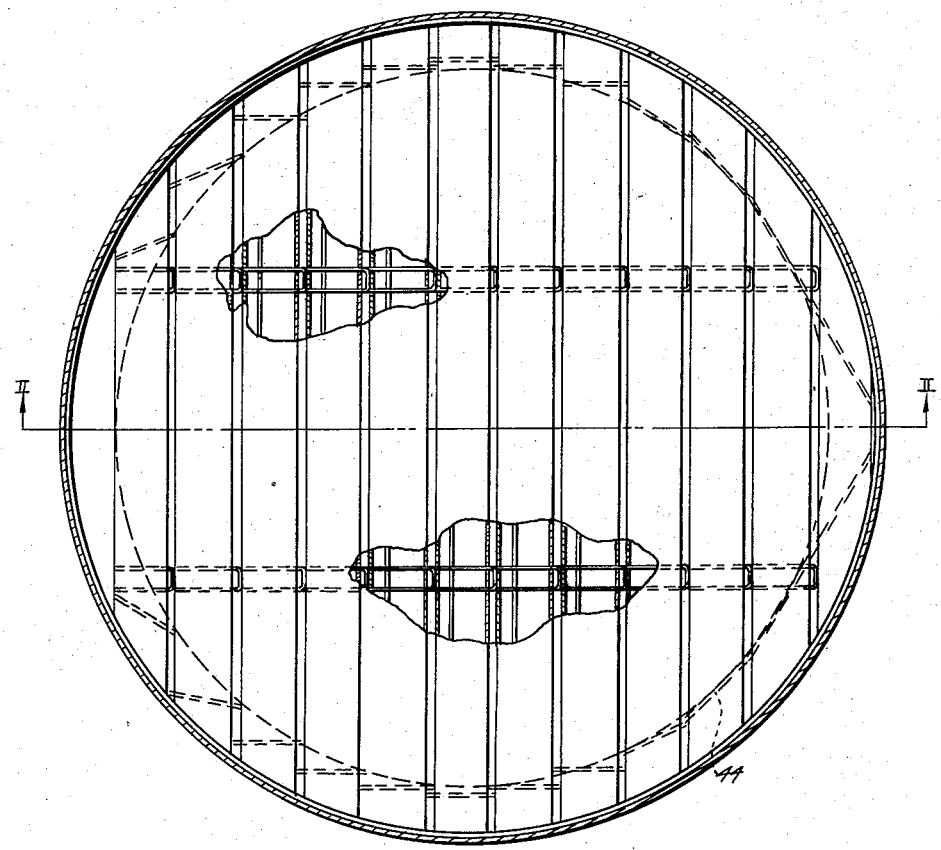
Figure 1 is a horizontal cross-sectional view through a fractionating column, illustrating a multicontact fractionation tray made pursuant to one form of the instant invention.
Figure 2:
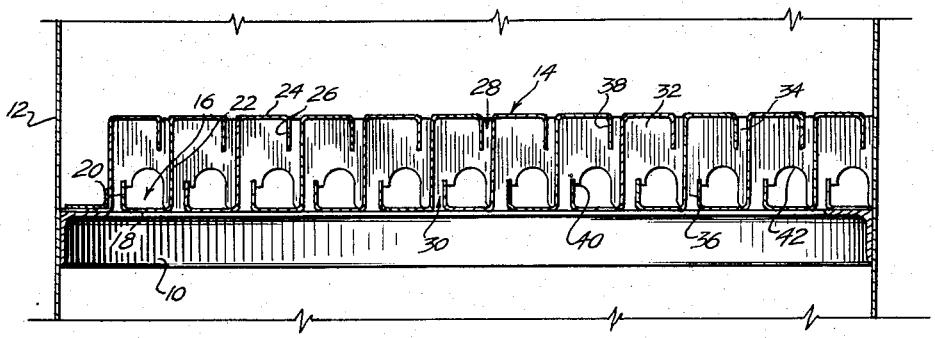
Fig. 2 is a fragmentary, vertical, cross-sectional view through the tray shown in Fig. 1.

In Figs. 1 and 2 of the drawings there is shown one type of multi-contact fractionation tray made according to the present invention supported by internal flange structure 10 with in tower 12, the tray itself being broadly designated by the numeral 14.

Tray 14 includes a plurality of elongated open top troughs 16 spanning the distance across the tower 12 and each provided with a horizontal bottom wall 18, a relatively short, vertical side wall 20, and a relatively tall, vertical side wall 22 spaced from the short wall 20. A top wall 24 extending laterally from the uppermost edge of the side wall 22 is in the nature of an elongated panel and terminates in a downturned flange 26. Such modified Z-shaped structure may be rolled from sheet material and it is to be understood that the walls 20, 22 and 24 as well as the flange 26 are substantially coextensive in length.

Flanges 26 are spaced from next adjacent walls 22 presenting spaces 28 and similarly the short walls 22 are spaced from next adjacent walls 22 to present spaces 30. By virtue of the fact that the walls 22 are all in parallelism, the spaces 28 and 30 are of uniform width throughout the lengths thereof. It is seen that the downturned flange 26 as well as the upturned wall 20 of each member provides for added structural strength and the wall 20 presents the troughs 16 for redistribution of liquid as it flows from one tray to the tray therebelow. Additionally, by virtue of such construtcion the slots 28 and 30 are presented for passage of rising vapor to contact overflowing liquid as will hereinafter be made more clear.

A transverse series of combination stiffener and spacer plates 32 secured to the walls 22 therebtween may be U-shaped if desired, as shown in the two series thereof in Fig. 1, or be made of single plates as hereinafter set forth in connection with the modifications illustrated by Figs. 3 to 6 inclusive.

Each plate 32 is provided with extensions 34 and 36 within corresponding slots 28 and 30 respectively and joinder may also be made such as by spot welding with the upturned walls 20 as well as with the downturned flanges 26. Slots 38 and 40 are formed in each of the plates 32 for receiving the flange 26 and the wall 20 respectively. Openings 42 within the plates 32 permit more free flow of liquid throughout the lengths of the troughs 22 prior to overflow of such liquid over the walls 20 and thence downwardly through the slots 30. End closures 44 similar in nature to the spacers-stiffeners 32 except only that the same are devoid of the openings 42 may be arranged substantially as shown by dotted lines in Fig. 1, to conform to the circular configuration of the tower 12.

An important feature of the instant invention lies in the fact that the width of the slots 28 is less than the width of the slots 30. By virtue of this fact the flow of liquid into the tray through the slots or openings 28 is restricted, thereby maintaining a level of liquid on the uppermost surface of the tray above the top wall that is presented by the plurality of spaced apart panels 24. The said panels 24 are preferably all coplanar as are the bottom walls 18 and consequently, the slots 28 and 30 serve not only as passage means for downward flow of liquid but as passages for upward flow of vapors. Such vapors intimately contact the liquid from the bottom 18 throughout the slots 30 within the space presented between walls 18 and 24, within the slots 28 and through the liquid on the tray to the uppermost level thereof. Consequently, there is presented a plurality of zones of turbulence within the tray for intimate contact of the vapor rising from the liquids and the liquid itself as it gravitates through the tray and to a tray therebelow, wherein the Z-shaped elements are arranged in intersecting relationship to the members of the tray thereabove.

In the form of my invention shown by Fig. 3 of the drawing, Z-shaped elements 50 are identical with those illustrated in Figs. 1 and 2 but the combination spacer and stiffner elements differ in that the same are composed of a pair of sections 52 and 54. These plates 52—54 are intersected by a horizontal partion 56 intermediate top walls 58 and bottom walls 60 and having passage means in the form of elongated, longitudinally extending slots 62 for receiving and further intermingling gravitating fluid and upwardly rising vapors. The sections 52 and 54 of the plates are in turn provided with lateral flanges 64 and 66 respectively, welded or otherwise secured directly to the partition 56.

In Fig. 4 of the drawings the combination spacer and stiffner plates are composed of a pair of sections 70 and 72 in the same manner as in Fig. 3, and having lateral flanges 74 and 76 respectively attached to an intermediate horizontal partition 78. However, the partition 78 is in the nature of a plurality of elongated longitudinally extending bars 80 in spaced parallelism presenting slots 82 for passage of liquid and vapor.

In Fig. 5 of the drawings the substantially Z-shaped members are somewhat modified in that the down-turned flanges 90 thereof connect directly with next adjacent upstanding walls 92, and panels 94 forming the top wall of the tray are provided with a plurality of longitudinal slots 96 for passage of fluid in the manner above described.

In Fig. 6 of the drawings the top wall of the tray is in the nature of a plurality of elongated, spaced apart panels 100, secured to the combination spacer and stiffener plates 102 at the uppermost edges of the latter, and if desired, certain of the panels or bars 100 may be also attached to lateral extension 104 on the uppermost end of wall 106, which extension 104 is, of course, comparable to the panels 24 shown in Figs. 1 and 2 of the drawings.

As shown in Fig. 7 of the drawings, it is said to be preferred that the spacing between the ends of the substantially Z-shaped elements and the inner wall of the tower or column 12 be substantially the same as the width of the slots 28. In order to allow for expansion and contraction a desirable fastener 120 is provided for attachment of the bottom walls of the tray to the flange structure 10. It consists of a stud bolt 122 having a polygonal portion 124 intermediate the ends thereof fitting within an elongated slot 126 in the bottom wall of the tray. By virtue of the provision of opposed nuts 128 on the stud 122, the fastener 120 may be removed from above or below the corresponding tray.

It is manifest from the foregoing that the tray 14 shown in Figs. 1 and 2 of the drawings is the simplest of the various forms but, while the modification illustrated by Fig. 6, for example, might well operate more efficiently, the expense of fabrication is appreciably greater. Similarly, the form illustrated by Fig. 5 of the drawings, while perhaps less efficient than that shown in Fig. 6, is less expensive to fabricate than the latter.

In any event, all of the trays are characterized by the fact that the same are highly flexible, capable of low pressure drop and adapted for high capacity operation. In each tray there is provided means to assure multiple-contact of the vapor with the grativating liquids and, therefore, the efficiency of the tower so far as frothing of the liquid is concerned presents a decided improvement over tray structure heretofore suggested in this field.

Having thus described the invention what is claimed as new and desired to be secured by Letters Patent is:

1. In a fractionation tray for distillation and absorption towers, a plurality of elongated, open top troughs each having a horizontal bottom wall, a relatively short, vertical side wall rising from one edge of the bottom wall, a relatively tall, vertical side wall rising from the opposite edge of the bottom wall, a horizontal top wall extending from the top of the tall side wall in a direction oppositely to the bottom wall, and a vertical flange depending from that edge of the top wall remote from the tall side wall, the lower extremity of said flange being at a level spaced above the upper extremity of said short side wall; and means for mounting said troughs in side-by-side, parallel arrangement with said top walls of the troughs coplanar, said flange of each intermediate trough of said arrangement overlying the bottom wall of an adjacent trough and spaced laterally from the tall side wall of the latter a distance substantially less than the distance between said flange and the tall side wall of the trough of which said flange forms a part, and said short side wall of each intermediate trough of said arrangement underlying the top wall of an oppositely adjacent trough and spaced laterally from the tall side wall of the latter a distance substantially less than the distance between said short side wall and the tall side wall of the trough of which said short side wall forms a part, whereby there is presented a liquid inlet opening of relatively small cross sectional area for each trough between the tall side wall thereof and the flange of an adjacent trough, a liquid outlet slot of relatively small cross sectional area for each trough between the short side wall thereof and the tall side wall of an adjacent trough, and a turbulence zone of relatively large cross sectional area for each trough between the bottom and tall side walls thereof and the top and tall side walls of an adjacent trough.

2. A fractionation tray as set forth in claim 1 wherein is provided a transverse series of combination stiffener and spacer plates secured to the tall walls therebetween; and wherein said top walls comprise at least one pair of spaced, longitudinally extending bars secured to the uppermost edges of the plates, said openings constituting the spacing between the bars.

3. A fractionation tray as set forth in claim 1 wherein is provided horizontal partitions between the tall walls and intermediate the top and bottom walls and having passage means for flow of liquid and vapor.

4. A fractionation tray as set forth in claim 1 wherein is provided a transverse series of combination stiffener and spacer plates secured to the tall walls therebetween; and horizontal partitions intersecting the plates intermediate the top and bottom walls and having passage means for flow of liquid and vapor.

5. In a fractionation tray as set forth in claim 1, wherein the distance between the tall side wall of each intermediate trough and the flange of the adjacent trough is less than the distance between the short side wall of said intermediate trough and the tall side wall of the oppositely adjacent trough, whereby said inlet openings are of lesser cross sectional area than said outlet slots to maintain level of liquid atop said top walls.

6. A fractionation tray as set forth in claim 1 wherein is provided a transverse series of combination stiffener and spacer plates secured to the tall walls therebetween.

7. A fractionation tray as set forth in claim 6 wherein the plates have extensions within the slots interconnecting the short and tall walls.

8. A fractionation tray as set forth in claim 6 wherein the plates have extensions within the slots interconnecting the short and tall walls, and slots receiving the uppermost edges of the short walls, there being a hole in each plate for free flow of liquid through the troughs.

9. A fractionation tray as set forth in claim 1 wherein is provided a transverse series of combination stiffener and spacer plates secured to the tall walls therebetween.

10. A fractionation tray as set forth in claim 9 wherein each plate has a slot receiving a proximal flange.

References Cited in the file of this patent

UNITED STATES PATENTS

| | | |
|---|---|---|
| 2,319,814 | Harmon | May 25, 1943 |
| 2,699,929 | Bowles | Jan. 18, 1955 |
| 2,714,504 | Bowles | Aug. 2, 1955 |